July 17, 1951

C. N. BEBINGER 2,560,917

LUBRICANT SEAL

Filed Sept. 19, 1945

INVENTOR.
Charles N. Bebinger
BY
Stoodling and Krost
attys.

Patented July 17, 1951

2,560,917

UNITED STATES PATENT OFFICE 2,560,917

LUBRICANT SEAL

Charles N. Bebinger, New Philadelphia, Ohio, assignor to Joy Manufacturing Company, a corporation of Pennsylvania Application September 19, 1945, Serial No. 617,311

6 Claims. (Cl. 286—5)

My invention relates in general to bearing devices, and more particularly to bearing devices having grease seals therein to hold grease within the bearing and exclude dirt and grit.

An object of my invention is to provide an improved pliable seal between relatively rotatable circular surfaces of a bearing to seal grease in the bearing and seal grit out of the bearing.

Another object of my invention ois to provide an improved bearing device which may be readily disassembled to replace worn parts and to repack with grease.

Another object of my invention is the provision of a disassemblable bearing having a pliable seal compressed between two side compression elements to force the seal tightly against the surface to be sealed, and the seal having a portion thereof forming an auxiliary, pressure seal to compensate for wear thereof.

Figure 1:
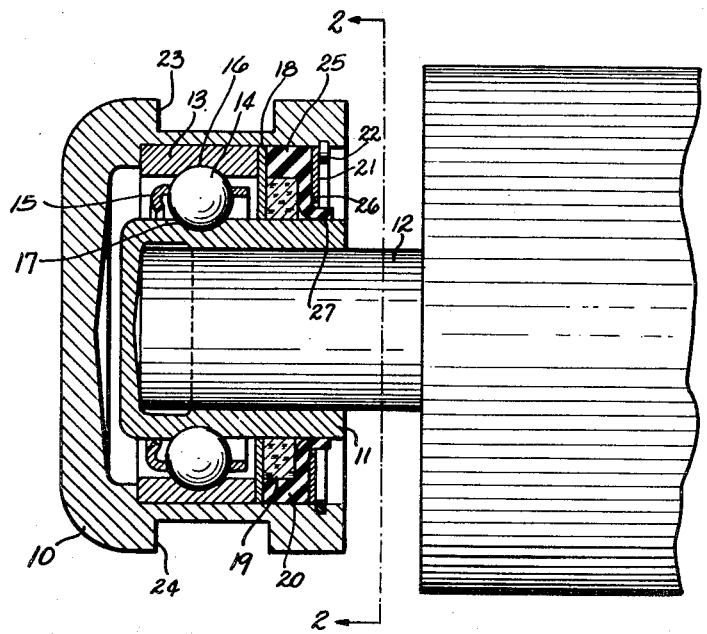
Figure 2:
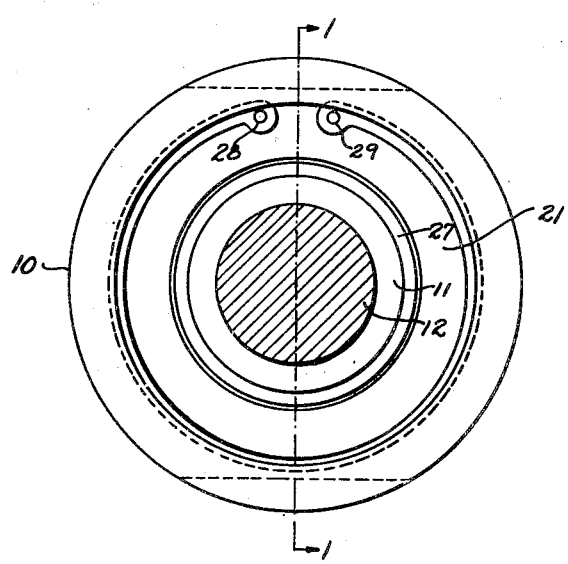

Other objects and a fuller understanding of my invention may be had by referring to the following description and claims taken in conjunction with the accompanying drawing in which:

Figure 1 is a central longitudinal sectional view taken along the line 1—1 of Figure 2 and illustrating my improved bearing device in position to support a rotating shaft; and Figure 2 is a cross-sectional view along the line 2—2 of Figure 1.

Bearing devices which are to operate under gritty environments, are preferably made in such a manner that they may be readily disassembled for replacing worn parts and for repacking with grease. Although many types of disassemblable bearings have been developed, I have found that in most of these devices the grease seal used soon becomes worn to the extent that grease readily seeps out of the bearing, and grit and dirt works its way in. Thus, the working life of the bearing is greatly reduced.

With reference to the drawing, I illustrate a disassemblable bearing employing the preferred embodiment of my improved grease seal. The reference character 10 indicates the bearing housing which may have any suitable external form to fit a holder or other support. I have illustrated the housing 10 as having two chordal slot portions 23 and 24 for the purpose of holding the bearing in a bracket.

The bearing parts, which carry the load, may be of any suitable design and may comprise an inner race core member 11 having a race 17 therein and an outer race member 13 having a race 16 therein between which are placed a plurality of bearing elements 14 being illustrated as balls in this particular case. The balls are spaced circumferentially away from each other by means of a ball spacer 15. The inner race core member 11 comprises a cup-shaped member and is adapted to be pressed upon the shaft 12 so that it rotates with the shaft. The outer race member 13 is adapted to make a snug fit with the inner surface of the housing 10 so that relative movement will occur between the outer and inner races when the shaft is rotated. The core member 11 and the housing member 10 are axially co-extensive substantially for their full length, whereas the outer race 13 is foreshortened. As may readily be seen from the drawing, a space is provided between the housing 10 and the core member 11 in which grease may be inserted to lubricate the bearing action. This grease must be effectively sealed within the housing 10 in order to maintain effective bearing life, and exclude the entrance of grit. Therefore, I employ an improved sealing device comprising a retainer plate 18, a cork seal 19, a natural or synthetic rubber seal 20, and a compression device comprising a pressure washer 21 and a snap ring 22 having interlocking surfaces to fit a groove on the inner surface of the housing 10. The cork seal 19 is used because of its pliable nature, and its ability to hold a quantity of graphite in the interstices thereof. However, other suitable pliable sealing materials might well be employed in place thereof. The rubber seal 20 used in conjunction with the cork seal 19 may be preferably made of a synthetic rubber material resistant to the action of grease. This rubber seal 20 is somewhat L-shaped in cross section and comprises a base part 25 and a stem 26. This seal 20 is positioned with the base part 25 of the L between the cork seal 19 and the inner surface of the housing 10. The stem 26 of the L extends radially inwardly from the part 25, and is adapted to fit along the side of the cork seal 19. The stem part 26 is preferably made long enough to curve away from the seal 19 and form a sealing sleeve or lip 27 around the outside surface of the core member 11. It will be readily understood, that the bending of the stem part 26 of the L as illustrated and described to form a sleeve or lip 27 will set up a bending stress in the rubber which tends to press the sleeve 27 of the rubber seal 20 tightly against the outer surface of the core member 11 and will make a good seal with the shaft.

The pressure washer 21 fits tightly against the outer side of the rubber seal 20. I have provided the snap ring 22 to hold the pressure washer 21 tightly in place in order to hold the pressure washer 21 tightly against the rubber seal 20 and cause the seal 20 to press firmly against the inside surface of the housing 10 and against the top and side of the pliable cork seal 19. Thus, the rubber seal 20 is tightly compressed between the retainer plate 18 and the pressure washer 21, and will therefor provide a continuous sealing pressure for itself and the cork seal 19. The base part 25 of the L-shaped rubber seal 20 expands radially as side pressure is applied thereto, and thus forces the cork seal 19 against the outer surface of the inner race core member 11. As the surfaces of the seal 19 and the sealing ring 20 wear because of mechanical action, the rubber seal 20 will gradually press the surfaces tightly against the bearing surfaces to continuously maintain a good seal to prevent the passage of grease therebetween. Although any convenient type of snap ring or screw pressure device might be used, I have found that for rapid disassembly, a snap ring comprising a circular spring steel snap ring having two eyes 28 and 29 is preferable. Thus, a plier like tool may be inserted into the openings 28 and 29 and used to draw the two openings 28 and 29 together and the snap ring 22 will then be reduced in diameter and easily withdrawable from the groove.

To assemble my improved bearing and seal, the bearing, including the balls 14, the race member 13, and the spacer means 15 is put in place upon the core 11 in the usual manner of assembling similar bearings with the balls 14 positioned to operate in the races 16 and 17. The housing 10 is then slipped over the outer race member 13 to the position shown in the Figure 1 of the drawing. Thereafter, grease is placed in the cavity formed between the housing 10 and the core 11. After the grease is in place, the retainer plate 18 is slipped in against the edge of the race member 13. Thereafter the cork seal 19 and the rubber seal 20 may be put in place as illustrated, and the pressure washer 21 squeezed tightly against the edge of the rubber seal 20 with one leg of the seal 20 extending between the pressure washer 21 and the outer surface of the core 11. This pressure washer 21 is then held in place by snapping the snap ring 22 into the retainer groove of the housing 10.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A seal between a first and a second axially co-extensive spaced relatively rotatable circular surface, comprising a retainer plate to substantially close the space therebetween, a first pliable seal, a second pliable seal, and compression means, said first pliable seal being adapted to form a seal with said first circular surface, said second pliable seal having substantially an L-shaped cross section and having a surface adapted to form a seal with said second circular surface, said first pliable seal being disposed with a surface thereof in sealing contact with said first rotatable circular surface and being spaced from the said second surface, said second pliable seal being disposed with the said surface thereof in sealing contact with the said second rotatable circular surface and with one leg of the L-shaped second sealing ring filling the space between the said first pliable seal and the second surface, the other leg of said L-shaped second sealing ring extending to the first circular surface and covering the first pliable seal, and said compression means comprising a pressure washer member and a snap ring member, said snap ring member having interlocking surfaces with the said second circular surface, said compression means acting on said second pliable seal to press the latter against said retainer ring to force the surfaces of the first and second seals tightly into contact with their respective contacting surfaces and to press the one leg of the L-shaped second sealing ring tightly against the side of the first sealing ring, said leg extending between the first circular surface and the pressure washer and forming a seal therewith.

2. A seal between concentric cylindrical surfaces, comprising a retainer washer substantially closing the annular space between said concentric surfaces, a pliable sealing ring, a coacting pliable sealing ring, said rings respectively having sealing contact with said concentric surfaces, and compression means for maintaining said sealing rings under compression comprising a pressure washer and a releasable lock having at one peripheral edge of said pressure washer interlocking engagement with one of said surfaces and said pressure washer having its other peripheral edge spaced from said other surface, and one of said sealing rings which sealingly contacts one surface having a flexible annular lip portion extending axially of its body inwardly of said spaced edge of said pressure washer and held compressed by said compression means radially inwardly tightly against the other surface in sealing contact therewith.

3. A seal between concentric cylindrical surfaces, comprising an inner retainer washer having its outer peripheral edge substantially fitting the outer surface and its inner circular edge substantially fitting said inner surface thereby substantially closing the annular space between said surfaces, a pliable sealing ring having sealing contact with said inner surface, a coacting pliable sealing ring having sealing contact with said outer surface, and compression means for maintaining said sealing rings under compression comprising a pressure washer and a releasable lock having at the outer peripheral edge of said pressure washer interlocking engagement with the outer surface, said pressure washer having its inner peripheral edge spaced a small distance from said inner surface, and said second pliable sealing ring having a flexible inner lip portion extending axially away from its body inwardly of said spaced peripheral inner edge of said pressure washer and held under compression by said compression means radially tightly against said inner surface in sealing contact therewith.

4. A seal comprising housing means providing concentric inner and outer cylindrical surfaces, a retainer washer having its inner and outer peripheral edges substantially fitting against said concentric surfaces thereby substantially to close the annular space between said surfaces, a pliable sealing ring, a coacting pliable sealing ring, both of said rings engaging the adjacent face of said retainer washer and respectively having sealing contact with said outer surfaces, and compression means for maintaining said sealing rings under compression including a pressure washer at its outer peripheral edge substantially fitting said outer surface and having its inner peripheral edge spaced a small distance from said inner surface and releasable locking means interlocked with said outer surface and engaging said pressure washer at its outer peripheral edge to lock said latter washer in place, said sealing ring which has sealing contact with said outer surface having an inner flexible lip portion extending axially of its body inwardly of said spaced inner surface of said pressure washer and held under compression by said compression means radially inwardly against said inner surface in sealing contact therewith.

5. A seal comprising housing means providing concentric inner and outer cylindrical surfaces, a retainer washer having its inner and outer peripheral edges substantially fitting against said concentric surfaces thereby substantially to close the annular space between said surfaces, a pliable sealing ring, a coacting pliable sealing ring, both of said rings engaging the adjacent face of said retainer washer and respectively having sealing contact with said surfaces, and compression means for maintaining said sealing rings under compression including a pressure washer at its outer peripheral edge substantially fitting said outer surface and having its inner peripheral edge spaced a small distance from said inner surface, and releasable locking means interlocked with said outer surface and engaging said pressure washer at its outer peripheral edge to lock the latter washer in place, said sealing ring which has sealing contact with said outer surface having an inner flexible lip portion extending inwardly of said spaced inner surface of said pressure washer and held under compression by said compression means in sealing contact with said inner surface and said lip portion when under compression projecting axially into the space provided between the inner edge of said pressure washer and said inner surface.

6. A lubricant seal between concentric cylindrical surfaces, comprising a retainer washer held against movement in one direction axially relative to said surfaces and substantially closing the annular space between said surfaces, a pair of coacting pliable sealing rings engaging the adjacent face of said retainer washer and filling the annular space in a transverse zone between said surfaces, said sealing rings respectively having sealing contact with said surfaces, and compression means for maintaining said sealing rings under compression comprising a pressure washer at its inner surface engaging the adjacent sealing ring, and releasable means having interlocking connection with one of said surfaces for locking said pressure washer in place, and one of said sealing rings having a flexible sealing lip extending axially away from said transverse zone and held under compression by said compression means in sealing contact with the other of said surfaces.

CHARLES N. BEEINGER.

REFERENCES CITED

The following references are of record in the file of this patent:

UNITED STATES PATENTS

| Number | Name | Date |
| --- | --- | --- |
| 1,577,725 | Jones | Mar. 23, 1926 |
| 1,717,114 | McNulty | June 11, 1929 |
| 1,774,662 | Parks | Sept. 2, 1930 |
| 1,996,610 | Bott | Apr. 2, 1935 |
| 2,074,672 | Rogers | Mar. 23, 1937 |
| 2,080,670 | Nelson | May 18, 1937 |
| 2,092,237 | Antonelli | Sept. 7, 1937 |
| 2,211,899 | Kriegbaum | Aug. 20, 1940 |
| 2,276,225 | Carter | Mar. 10, 1942 |

FOREIGN PATENTS

| Number | Country | Date |
| --- | --- | --- |
| 848,463 | France | Oct. 31, 1939 |